INVENTOR.
Edgar Earle Littlefield

Feb. 7, 1950 E. E. LITTLEFIELD 2,496,553
VALVE MECHANISM
Filed Nov. 18, 1942 2 Sheets-Sheet 2
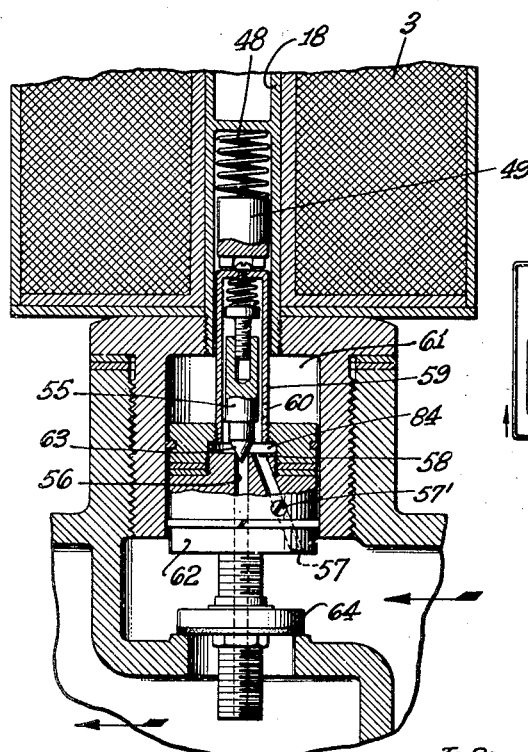
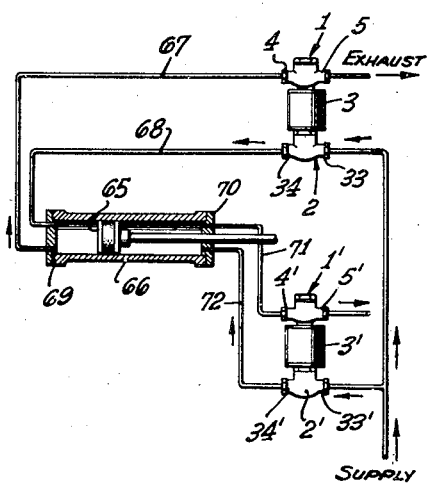
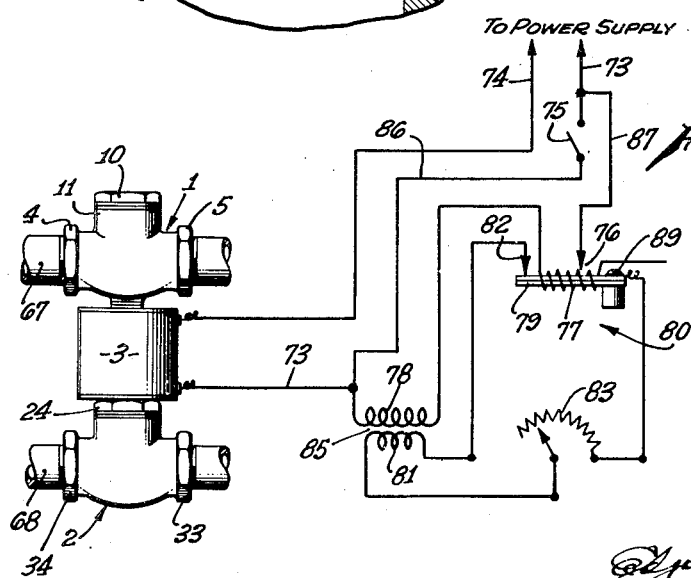
INVENTOR.

Patented Feb. 7, 1950

2,496,553

UNITED STATES PATENT OFFICE 2,496,553

VALVE MECHANISM

Edgar Earle Littlefield, Los Angeles, Calif.

Application November 18, 1942, Serial No. 465,994

17 Claims. (Cl. 137—144)

The invention relates to improvements in valves and control systems, and has particular reference to fluid pressure operated valves and valve systems.

The invention further relates to fluid pressure operated valves suitable for controlling the supply and exhaust for a cylinder having a piston therein to be reciprocated and to drive a suitable element.

An object of the invention is to provide a common control for fluid pressure operated valves, as well as for valves of other types, controlling the supply and exhaust for a working piston.

The invention also relates to fluid pressure operated valves each having a pilot valve to control the operation thereof, and the invention has for an object to provide a common electrical control for operating the pilot valves, in such manner that one of the main valves may remain closed while the other thereof is open.

Another object of the invention is to employ the pilot valve principle for the double function of controlling the exhaust and the supply for the fluid pressure operated member of a power controlling cylinder.

Another object of the invention is to provide a compact unitary assembly of main supply and exhaust valves and common actuating means therefor.

Another object is to improve the construction and operation of fast opening valves, slow closing valves, fluid pressure operated valves and electrically operated valves.

For further details of the invention reference may be made to the drawings wherein Fig. 1 is a vertical sectional view through a valve assembly according to the present invention.

Fig. 4 is an enlarged vertical sectional view with parts broken away of a further modification of a main valve.

Fig. 5 is a schematical circuit diagram illustrating one manner of using the valve assembly of Fig. 1.

Fig. 6 is a schematical wiring diagram that may be employed in the control of translating devices, including such as those described herein.

Figure 1:
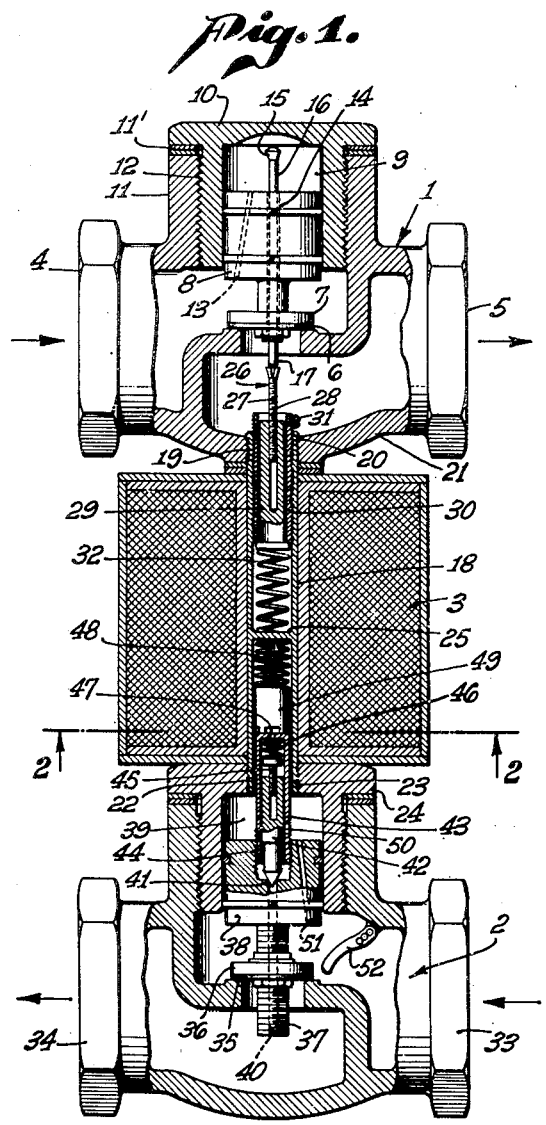
Figure 2:
Fig. 2 is a sectional view on line 2—2 of Fig. 1 looking in the direction of the arrows.

Referring in detail to the drawings, Fig. 1 illustrates a main exhaust valve 1, a main supply valve 2, both of which are fluid pressure operated and which are assembled with a common electrical actuating member in the form of a solenoid 3. The valves 1 and 2 and solenoid 3 are preferably mounted together to form a unitary structure.

The exhaust valve 1 has an inlet 4 and an outlet 5 and therebetween a valve seat 6 having above it a valve head 7 which carries a piston 8 slidable in a chamber 9 formed in the cap 10 which is adjustably screw-threaded in the neck 11 as indicated at 12. The distance that cap 10 projects in neck 11 can be adjusted by means of washers 11′, and similar adjustment is possible with all other valve caps shown. The piston 8 has a comparatively small inlet passage 13 extending therethrough to admit fluid under pressure from inlet 4 behind the piston 8 to seat the valve 7 at certain times. The piston 8 also has axially therethrough a comparatively large drain passage 14, the upper end of which forms a seat for the pilot valve 15 carried by a stem 16 which slides in the passage 14 and which extends below the bottom of the valve head 7 as indicated at 17.

The valves 1 and 2 are physically mounted together by a tube 18 of nonmagnetic material, the upper end of which is secured by screw threads 19 in an opening 20 in the bottom 21 of the casing of valve 1. The lower end of tube 18 is connected by screw threads 22 in an opening 23 in the cap 24 of valve 2. An intermediate portion of tube 18 is sealed off by a wall 25. The valve stem 16, for pilot valve 15, is actuated at times by a push rod 26 which is longitudinally adjustable by means of screw threads 27 in a threaded aperture 28 in an armature 29 of magnetic material. Armature 29 is in the form of an elongated cylindrical rod, and has a sliding fit in a tube 30 of nonmagnetic material which is screw threaded inside of tube 18. An annular flange or shoulder on the lower end of armature 29 contacts the lower end of tube 30 limiting the upward travel of the armature, which is urged upwardly by a compression spring 32. A set screw 31 placed in any desired position would serve the same purpose, and this could also be used for locking the armature against operation if for any reason it is desired to do so. Around the tube 18 and extending between the bottom 21 of valve 1 and the cap 24 of valve 2 is a solenoid 3. When solenoid 3 is energized, the armature 29 is moved towards the center of solenoid 3, against the action of spring 32, thereby retracting the push-rod 26 and allowing the valve stem 16 to descend and the valve 15 to close.

The supply valve 2 has an inlet 33, an outlet 34 and therebetween a valve seat 35 for a main valve head 36 mounted on a screw-threaded stem 37 which has at its upper end a piston 38 slidable in the chamber 39 in the cap 24. The piston 38 has an axial drain passage 40 therethrough, the upper end 41 of which serves as a valve seat for the pilot valve 42 preferably of magnetizable material, such as stainless iron. The pilot valve 42 is circular in cross section and is freely reciprocable in the casing 43, of non-magnetic material. Casing 43 is secured by screw threads 44 in a bore in the top of piston 38. The pilot valve 42 at its upper end is provided with an adjustable abutment in the form of a screw 45, preferably of magnetizable material, against which bears a compression spring 46, the upper end of which bears against the top of pilot valve casing 43. The top of casing 43 has a threaded breather hole 47, which may, if desired, be closed by a small screw. The casing 43 and the piston 38 and valve 36, all of which are arranged in operative relation, are urged in a downward direction by spring 48 between the underside of wall 25 and the top of a sliding armature 49 of magnetizable material, such as stainless iron, which rests on the top of casing 43, and which may, if desired, be provided with side openings at the bottom, for release of fluid. The side of casing 43 is provided with a port 50 so positioned that it will be uncovered when the valve 42 is raised against the action of spring 46, due to energization of solenoid 3. Adjustable mounting of casing 43 permits adjustments to be made in the position of the port 50. Piston 38 has an inlet passage 51 therethrough, somewhat smaller than drain 40, communicating with chamber 39. Port 50 may be of any desired dimensions and may, if desired, be employed to regulate flow of fluid from chamber 39. The space provided for piston 38 and valve head 36 may easily be such that a piston and valve arrangement, such as 8 and 7 of valve 1, may be substituted therefor, if desired. In such case valve means 53 of Fig. 3 will be found a satisfactory means for controlling drain passage 14.

When solenoid 3 is de-energized, or when the device is disconnected from the supply and exhaust lines, as is the case in Fig. 1, the various parts are in the position shown in this figure.

Assuming that the device is properly connected for use, solenoid 3, when energized, will cause the armature 29 and pilot valve 42 to move toward the center of solenoid 3. Movement of armature 29 downwardly retracts push-rod 26 and compresses spring 32 permitting pilot valve 15 to close, whereby the pressure admitted through inlet passage 13 builds up on top of piston 8, causing it to close valve 7 or holding it closed, if it is already in the position shown in Fig. 1. When pilot valve 42 moves upwardly it uncovers valve seat 41 and port 50, permitting the pressure on top of piston 38 to be relieved faster than it is built up through the inlet passage 51, whereby the pressure on the under side of piston 38 overpowers the pressure on the top thereof, and the valve 36 moves to open position.

De-energizing of the solenoid permits fluid pressure, admitted from inlet 33 through passage 51 to chamber 39, to accumulate above piston 38, thus closing valve 36. Pilot valve 15, of upper valve 1, has now assumed an open position under action of the compression spring 32. When fluid is exhausted from the cylinder under pressure, the pressure on the underside of piston 8 will be greater than on its top because pressure will escape through drain passage 14 faster than it is built up in chamber 9 through passage 13, hence the valve 7 under these conditions will open.

If desired, the inlet 33 may be provided with a pivoted knocker 52 actuated by inrush of fluid to strike the underside of piston 38 and help it to rise. This or any other suitable impact device may be employed in connection with any of my valves, when desired, to aid in unseating the same.

Figure 3:
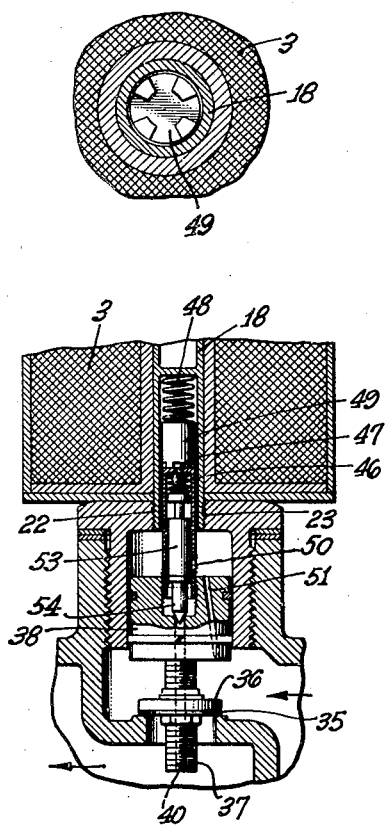
Fig. 3 is a vertical sectional view, with parts broken away, showing a modified form of pilot valve.

In the modification in Fig. 3 the pilot valve 53 is similar in construction to that shown in my Patent 1,633,217. The needle valve 54, having a reduced diameter, comes opposite the port 50 when the pilot valve is in raised position, increasing the effectiveness of the valve.

In the modification in Fig. 4, the pilot valve 55 controls not only the axial drain passage 56, as before, but also the inlet passage 57 because the discharge end 58 thereof, as well as passage 56, communicate with chamber 84, which is in communication with the interior of the pilot valve casing 59. The shank of valve 55, being of a diameter which almost fills the inside of casing 59, the flow of fluid through passage 57, when the valve is closed, as restricted between the side of valve 55 and inside of casing 59 in seeking an outlet through port 60 to reach chamber 61 above piston 62. When pilot valve 55 is in its raised position, its conical valve head 63 is withdrawn to a position above or adjacent port 60, so that the latter no longer restricts the discharge from chamber 61 through port 60 to drain passage 56. By thus controlling the fluid I provide the advantages of a quick opening and slow closing valve.

The flow through passage 57 may be adjusted by screw plug 57'. Similar regulating means may be used in connection with the other valves, if desired. Washers and a threaded connection between the upper and lower part of piston 62 enable certain adjustments to be made when desirable. A threaded connection between the piston 62 and valve head 64 also makes certain adjustments possible, although the parts may be made integral if desired. An adjustable connection also permits the main valve to be locked in closed position when it is desired to employ the drain passage only for control of fluid, as may be the case in the control of a low pressure gas. Or a nut may be added to the threaded piston stem and tightened up on the port wall. A similar arrangement may be provided for the valve 1, if desired.

Compression springs may, when desirable, be inserted between the tops of the pistons, such as 8, Fig. 1, and the upper wall of the bonnets, for the purpose of urging the latter to their seats.

In order to increase the effectiveness of the device and enlarge its scope of usefulness the parts in numerous cases are assembled in adjustable relation.

Fig. 5 illustrates a diagram of connections which may be employed for operating a piston 65 in a cylinder 66, although other connections may be used. As here illustrated, the inlet side 4 of exhaust valve 1 and the outlet side 34 of the inlet valve 2 are connected by pipes 67 and 68, respectively, to the same end 69 of the cylinder 66, while the other end 70 of cylinder 66 is connected by pipes 71 and 72 in a similar manner to the inlet side 4' of exhaust valve 1' and to the outlet side 34' of supply valve 2', respectively. With solenoid 3 de-energized, namely with the parts in the position shown in Fig. 1, referring now to Fig. 5, the end 69 of cylinder 66 can exhaust through pipe 67 and exhaust valve 1, so that piston 65 is free to move to the left. If solenoid 3' is now energized, the exhaust valve 1' is closed and the supply valve 2' is opened, thereby admitting pressure to the right side of piston 65 to urge it to the left. Piston 65 can, of course, be moved to the right by energizing solenoid 3 while leaving solenoid 3' de-energized.

A circuit arrangement which may be used for solenoid 3 is indicated in Fig. 6 wherein lines 73 and 74 lead to a suitable power supply. One side 74 is connected directly to solenoid 3, while the other side 73 is divided into branches 86 and 87. The branch 86 is connected through the switch 75 to the other end of 73 adjacent where it enters the solenoid; the other branch 87 is connected to an adjustable contact 76 on a resistance coil 77 surrounding the thermo-relay 80, thence through the primary 78 of a step-down transformer or impedance 85, beyond which it joins the line 73 leading to the solenoid 3. If switch 75 is momentarily closed, with thermostat 79 in the position shown in Fig. 6 a comparatively large starting current is supplied to solenoid 3, through lines 74, 73 and branches 86 and 87. Since branch 87 is normally in closed circuit relation with the current supply, the current will continue to flow through transformer winding 78 after switch 75 is opened, subject to control by secondary circuit 81, which includes a normally closed circuit controlling element 82 for a bi-metallic strip 79. The secondary circuit 81 also includes an adjustable resistance or rheostat 83 by means of which the proper current may be provided for holding the armatures, such as 29, 42, 49 and 55 in their operated position, less current being required to hold the armatures in operated position than is required to move them to this position. The contact 82 may be of the adjustable screw type. By reversing the bi-metallic element on the screw connection 89, or by otherwise employing an element that closes the circuit when heat is applied, the element may be employed for delaying the closing of a valve, or for continuing the operation of any other device connected for operation in a similar manner, for a predetermined time. In this case the contact would be normally open, but when switch 75 is closed, the heat developed in the bi-metallic strip 79 will cause it to close the circuit and thus hold the valve open until contact 82 opens, when the temperature of the bi-metallic member has dropped sufficiently.

In the first case above, i. e., when the contact 82 is normally closed, the circuit will open after a certain temperature rise in the bi-metallic element, thus preventing overheating of the device, such as solenoid 3. The bi-metallic strip may be provided with a longitudinal slot for adjustable connection with screw connection 89 if desired.

By the above means, either separately or together, as may be, the opening or closing of contact 82 may be controlled according to a predetermined time limit. The adjustable contact 76 provides for control of the heat applied to the bi-metallic member 79. The adjustable resistance or rheostat 83 may be employed either to limit the amount of current flowing in the primary 78 or to open the secondary circuit, as desired.

The above methods of control may be employed in the control of many different types of translating devices besides those indicated.

Obviously, the fluid control means I have provided may be used in connection with hydraulic control systems.

Detachably assembling the valves, as in Fig. 1, permits separation and independent employment of the same for controlling such fluids as water, refrigerants, gas, air, oil, etc.

Where the fluid to be controlled by an individual valve, as for instance the valve shown in Fig. 4, is of insufficient pressure to lift the main valve, after the pilot valve is unseated, as would probably obtain in some cases of gas supply, the drain passage alone would be of sufficient capacity. Of course, the drain passages of any of the valves may be of any capacity requisite for the particular purpose.

The valve 1, shown in the upper part of Fig. 1, could easily be of the type wherein a larger drain passage is controlled by a plurality of auxiliary valves such as are shown in my Patent 2,070,607, in which case the enlarged fluted upper end of push rod 26 would be omitted, to permit the same to telescope into the drain passage of the main valve shown in the patent. The guide 37, shown in the patent, could be used to cause an unseating of the smaller valve first. Obviously it is not always necessary to employ piston rings with the pistons of the main valves.

This application contains subject matter common to my pending application S. N. 333,696, filed May 6, 1940, now Patent Number 2,373,697.

In the drawings, like numerals refer to similar parts.

It will be apparent that any or all of the improvements herein disclosed for one of the valves can be employed in the others. Also the main valves can be used separately or in various combinations and in many ways other than as herein illustrated. Various other modifications may be made in the invention without departing from the spirit of the following claims.

I claim:

1. Electrically operated valve mechanism comprising the combination of a pair of fluid pressure operated valves each having a piston with a passage therethrough; pilot valves for said passages; switching means movable to one position to open one of said pilot valves and close the other and movable to another position to reverse the operation of said pilot valves; electrical actuating means for said switching means.

2. The combination of fluid pressure operated supply and exhaust main valves each having a pilot valve controlling operation thereof, means supporting said pilot valves for movement along a common axis, and common means supported along said axis operable to move said pilot valves simultaneously in opposite directions on said axis.

3. The combination of fluid pressure operated supply and exhaust main valves each having a pilot valve controlling operation thereof, and movable at times toward a common point; yieldable means tending to maintain said pilot valves at a spaced distance from each other; and electrical means for overcoming said yieldable means.

4. A valve assembly comprising valve housings, a spacer connecting the housings, a valve in each housing controlling flow therethrough, a fluid pressure motor for each valve, a pilot valve for each motor, magnetic armatures one for each pilot valve adjacent the spacer, a solenoid surrounding the spacer and armatures, whereby energizing the solenoid effects actuation of the armatures and pilot valves and thereby controls the motors.

5. A valve mechanism comprising valve housings, a tubular spacer connecting the housings, a valve within each housing controlling flow therethrough, a fluid pressure motor for each valve, a pilot valve for each motor, magnetic armatures one for each pilot valve within the tubular spacer, a solenoid surrounding the spacer and armatures, whereby upon the solenoid being energized it effects actuation of the armatures and pilot valves and thereby controls the motors.

6. A valve assembly comprising valve housings, a tubular nonmagnetic spacer connecting the housings, a valve within each housing controlling flow therethrough, a fluid pressure motor for each valve, a pilot valve for each motor, magnetic armatures one for each pilot valve within the nonmagnetic spacer, a solenoid surrounding the spacer and armatures, whereby energization of the solenoid actuates the armatures and thereby controls the motors.

7. A valve assembly comprising, valve housings, a spacer between the housings, a valve within each housing controlling flow therethrough, a motor for each valve, a control for each motor, a magnetic armature for each control, and an electro-magnetic solenoid surrounding the armatures, whereby energizing of the solenoid may effect actuation of the motor controls.

8. A valve assembly comprising, two valve housings, a spacer between the housings, a valve within each housing for controlling flow therethrough, a motor for each valve, a control for each motor, a magnetic armature for each control, the armatures being movable toward and from each other, and an electro-magnetic solenoid surrounding the armatures for simultaneously drawing the armatures toward each other, and spring means for moving the armatures apart, whereby the solenoid when energized effects actuation of the motor controls in one direction and the spring means effects their movement in the other direction.

9. A valve mechanism comprising, two valve housings, a spacer between the housings, a valve in each housing for controlling flow therethrough, a fluid pressure motor for each valve, a pilot valve for each motor, a magnetic armature for each pilot valve movable toward and from each other, an electro-magnetic solenoid surrounding the armatures for simultaneously drawing the armatures toward each other, and spring means for moving the armatures apart, whereby the energizing of the solenoid effects actuation of the pilot valves in one direction and the spring means effects their operation in the reverse direction.

10. A valve structure comprising, two valve chambers each having a supply and a discharge opening therein and a valve port therebetween, a valve for the port of each valve chamber, a fluid pressure motor responsive to the pressure condition of the chamber for the valve of each motor, a pilot valve for each fluid pressure motor one pilot valve being arranged to cause its motor to open its main valve while the other motor is arranged to cause its motor to close its valve, a spacing means between and connecting the valve chambers, two armatures within the spacing means one attached to one of the two pilot valves and the other to the other one, and an actuating coil or solenoid surrounding the spacing means and solenoid, whereby as the solenoid draws the armatures toward each other the pilot valves of the respective motors will be operated.

11. An electrically controlled valve structure including a normally open valve, an auxiliary valve controlling the normally open valve, a normally closed valve, a second auxiliary valve for controlling the normally closed valve, two armatures one for actuating each of the two auxiliary valves, and a single electromagnetic coil common to the armatures of the two electromagnetically controlled auxiliary valves.

12. An electro-magnetically controlled valve structure including a normally open main valve, a second normally closed main valve, two auxiliary valves one for controlling each of the two main valves, two armatures one for operating each of the two auxiliary valves, a tubular core connecting the two main valves so as to hold them in fixed relation to each other, a single electromagnetic coil surrounding the tubular core for drawing the two armatures within the tubular core so as to operate the two auxiliary valves.

13. A valve structure including; a fluid chamber having a port provided with a valve seat; an inlet passage for said chamber and an outlet passage from said port, said chamber being so formed that fluid communication between said passages may be established only through said port; a second fluid chamber having a port provided with a valve seat; an inlet passage for the second fluid chamber and an outlet passage from the second port, the second chamber being so formed that fluid communication between the inlet passage and the outlet passage from the port may be established only through the second port; closures for said seats; magnetizable controlling means for said closures, each closure having a normal position and another position which it assumes upon energization of said magnetizable controlling means, means for returning each closure to its normal position upon each de-energization of the magnetizable controlling means; electrical energizing means common to the magnetizable controlling means, the former and the latter co-operating, when energized, to cause each closure to assume a predetermined one of said positions substantially simultaneously.

14. A valve structure including; a fluid chamber having a port provided with a valve seat; closure means for said seat; electrically actuated means including an armature coacting with said closure means by lost motion action; a second fluid chamber having a port provided with a valve seat; closure means for the seat of the second port; electrically actuated means including an armature aligned with the first-mentioned armature for the second closure means; electrical controlling means axially aligned with said armature for the electrically actuated means of both closure means.

15. A valve structure including; a fluid chamber having a port provided with a valve seat; an inlet passage for said chamber and an outlet passage from said port, the chamber being so formed that fluid communication between said passages may be established only through said port; a closure for said seat; a second fluid chamber adjacent the first having a port provided with a valve seat; an inlet passage for the second fluid chamber and an outlet passage from the second port, the second chamber being so formed that fluid communication between the inlet passage and the outlet passage from the port may be established only through the second port; a closure for the second seat; magnetizable controlling means for said closures, said means cooperating with said closures to provide substantially simultaneous operation thereof;

and electrical energizing means common to said magnetizable controlling means for energizing the same.

16. A valve structure including a plurality of adjacent fluid chambers; ports for said chambers; inlet passages for the chambers and outlet passages from the ports; seats for the ports, each fluid chamber and its associated parts being so formed that fluid communication between the passages may be established only by means of the port; valves for said seats; magnetizable controlling means for each valve, so designed and arranged that, when energized, each controlling means functions independently to cause substantially simultaneous operation of the valves; and electrical means common to the magnetizable controlling means of each valve for energizing the same.

17. A valve structure including a housing having a chamber with a port provided with a seat; an inlet passage for said housing and an outlet passage from said port, the housing and chamber being so formed that fluid communication between said passages may be established only by means of the port; closure means for said seat; magnetizable controlling means cooperating with said closure means by lost motion action; a second housing adjacent the first housing having a chamber with a port provided with a seat; an inlet passage for the second housing and an outlet passage from the second port, the second housing and chamber being so formed that fluid communication between said passages may be established only by means of the second port; closure means for the second seat; magnetizable controlling means for the second closure means; and electrical means common to the magnetizable controlling means of both closure means for energizing the same.

EDGAR EARLE LITTLEFIELD.

REFERENCES CITED

The following references are of record in the file of this patent:

UNITED STATES PATENTS

| Number | Name | Date |
| --- | --- | --- |
| 245,476 | Fried | Aug. 9, 1881 |
| 570,045 | Ongley | Oct. 27, 1896 |
| 604,358 | Alexander | May 24, 1898 |
| 813,083 | Cramer | Feb. 20, 1906 |
| 896,120 | Kramer | Aug. 18, 1908 |
| 1,017,198 | Bender | Feb. 13, 1912 |
| 1,083,810 | Engberg | Jan. 6, 1914 |
| 1,155,157 | Lewis | Sept. 28, 1915 |
| 1,306,966 | Marcoux | June 17, 1919 |
| 1,323,301 | Mardis | Dec. 2, 1919 |
| 1,515,673 | Geissinger | Nov. 18, 1924 |
| 1,786,234 | Forman | Dec. 23, 1930 |
| 1,790,547 | LaPointe | Jan. 27, 1931 |
| 1,948,377 | Hacker | Feb. 20, 1934 |
| 2,070,607 | Littlefield | Feb. 16, 1937 |
| 2,192,714 | Norman | Mar. 5, 1940 |
| 2,251,441 | Dillman | Aug. 5, 1941 |
| 2,278,967 | Allen | Apr. 7, 1942 |
| 2,320,008 | Price | May 25, 1943 |
| 2,322,911 | Beam | June 29, 1943 |